(12) United States Patent
Guo et al.

(10) Patent No.: US 12,513,107 B2
(45) Date of Patent: Dec. 30, 2025

(54) INTER-NETWORK-NODE NAT DETECTION METHOD, DEVICE, AND STORAGE MEDIUM

(71) Applicant: CHINA IWNCOMM CO., LTD., Shaanxi (CN)

(72) Inventors: Jinfa Guo, Shaanxi (CN); Ming Du, Shaanxi (CN); Guoqiang Zhang, Shaanxi (CN); Xiang Yan, Shaanxi (CN)

(73) Assignee: CHINA IWNCOMM CO., LTD., Shaanxi (CN)

( * ) Notice: Subject to any disclaimer, the term of this patent is extended or adjusted under 35 U.S.C. 154(b) by 26 days.

(21) Appl. No.: 18/724,877

(22) PCT Filed: Dec. 9, 2022

(86) PCT No.: PCT/CN2022/138028
§ 371 (c)(1),
(2) Date: Jun. 27, 2024

(87) PCT Pub. No.: WO2023/130901
PCT Pub. Date: Jul. 13, 2023

(65) Prior Publication Data
US 2025/0071084 A1    Feb. 27, 2025

(30) Foreign Application Priority Data
Jan. 5, 2022 (CN) .......................... 202210005432.6

(51) Int. Cl.
*H04L 61/256* (2022.01)
(52) U.S. Cl.
CPC .................................. *H04L 61/256* (2013.01)
(58) Field of Classification Search
CPC .................................................... H04L 61/256
See application file for complete search history.

(56) References Cited

U.S. PATENT DOCUMENTS

| 8,224,985 B2 * | 7/2012 | Takeda ................ H04L 61/2564 |
| | | 709/230 |
| 11,659,441 B2 * | 5/2023 | Zhang .................. H04W 72/52 |
| | | 370/229 |

(Continued)

FOREIGN PATENT DOCUMENTS

| CN | 102685262 A | 9/2012 |
| CN | 111935014 A | 11/2020 |

OTHER PUBLICATIONS

Alharbi et al, "Securing ARP in Software Defined NEtworks", IEEE 41st Conference on Local Computer Networks,, Nov. 7, 2016.*

(Continued)

*Primary Examiner* — Todd L Barker
(74) *Attorney, Agent, or Firm* — ArentFox Schiff LLP; Michael Fainberg

(57) ABSTRACT

The present application discloses an NAT detection method between network nodes, a device, and a storage medium. The method includes: a request node obtains first node information, takes the obtained first node information as payload data of an NAT detection request message or an NAT detection result request message, performs IP packet encapsulation on the NAT detection request message or the NAT detection result request message, performs protection processing on an NAT detection request packet obtained after encapsulation, sends the NAT detection request packet to a response node; and the response node performs deprotection processing on the received NAT detection request packet and obtains the payload data of the NAT detection request message or the NAT detection result request message, compares the obtained payload data with corresponding content in a first IP header of the NAT detection request packet, and determines an NAT detection result according to the comparison result.

20 Claims, 3 Drawing Sheets

(56) References Cited

U.S. PATENT DOCUMENTS

| | | |
|---|---|---|
| 2007/0253417 A1 | 11/2007 | Purnadi et al. |
| 2008/0071927 A1 | 3/2008 | Lee |
| 2016/0182357 A1* | 6/2016 | Martinsen ............... H04L 47/17 |
| | | 370/396 |
| 2016/0234113 A1 | 8/2016 | Constantinescu et al. |
| 2018/0359231 A1 | 12/2018 | Vemulapalli et al. |
| 2022/0210118 A1* | 6/2022 | Chen ................... H04L 61/2578 |
| 2024/0154929 A1* | 5/2024 | Kraiser ............... H04L 61/2517 |

OTHER PUBLICATIONS

Barik et al, "fling: A Flexible Ping for Middlebox Measurements", 2017 29th International Teletraffic Congress (ITC 29), Sep. 4, 2017.*

Jiang et al, "Study and Implement of VPN penetrating NAT based on IPSec protocol", Dec. 16, 2011.*

Eronen et al., "IKEv2 Mobility and Multihoming Protocol (MOBIKE)", rfc4555.txt, Network Working Group, Internet Society (ISOC) 4, Internet Engineering Task Force, IETF, standard, RFC 4555, Rue Des Falaises CH-1205 Geneva, Switzerland, XP015046296, Jun. 1, 2006, pp. 1-33.

Extended European Search Report and Search Opinion received for European Application No. 22918351.2, mailed on Mar. 17, 2025, 10 pages.

Kaufman et al., "RFC 7296-Internet Key Exchange Protocol Version 2 (IKEv2)", Internet Engineering Task Force (IETF), Available on internet at:<https://datatracker.ietf.org/doc/html/rfc7296#page-58>, XP055243756, Oct. 1, 2014, pp. 1-142.

International Search Report and Written Opinion received for PCT Patent Application No. PCT/CN2022/138028, mailed on Feb. 22, 2023, 13 pages (6 pages of English Translation and 7 pages of Original Document).

* cited by examiner

INTER-NETWORK-NODE NAT DETECTION METHOD, DEVICE, AND STORAGE MEDIUM

CROSS REFERENCES TO RELATED APPLICATIONS

The disclosure is a National Stage of International Application No. PCT/CN2022/138028, filed on Dec. 9, 2022, which claims priority to Chinese patent application No. 202210005432.6 filed to China National Intellectual Property Administration on Jan. 5, 2022, and entitled "An inter-network-node NAT detection method, apparatus and storage medium", the entire content of which are incorporated herein by reference.

TECHNICAL FIELD

The present disclosure relates to the field of communication technology, in particular to an inter-network-node NAT detection method, apparatus, device and storage medium.

BACKGROUND

At the beginning of the Internet network design, the security design was basically not included, so there are great security risks in network communication. With the passage of time and the development of technology, the network can be seen everywhere in people's lives, and its security risks are also fully exposed, which threatens people's property and safety. In this case, secure communication protocols such as Internet security protocol IPsec appear to make up for the defect that the initial network design did not consider the security requirements. However, due to the existence of NAT (Network Address Translation) on the Internet, it is impossible to know whether there is a NAT device in the deployment environment when deploying secure communication protocol projects such as IPsec (because whether there is a NAT device determines the secure communication guarantee manner). Therefore, it is necessary to use a NAT detection method to determine how to ensure secure communication by the secure communication protocols such as IPsec.

SUMMARY

In a first aspect, embodiments of the present disclosure provide an inter-network-node NAT detection method, including:
  obtaining, by a requesting node, first node information, and using, by the requesting node, the obtained first node information as payload data of a NAT detection request message or a NAT detection result request message, wherein the first node information includes an internet protocol (IP) address of the requesting node and an IP address of a configured responding node;
  performing, by the requesting node, IP message encapsulation on the NAT detection request message or the NAT detection result request message, performing, by the requesting node, protection processing on a NAT detection request packet message obtained after the encapsulation, and sending, by the requesting node, the NAT detection request packet message after the protection processing to the responding node;
  receiving, by the responding node, the NAT detection request packet message, and performing, by the responding node, de-protection processing on the received NAT detection request packet message;
  obtaining, by the responding node, the NAT detection request message or the NAT detection result request message from the NAT detection request packet message after the de-protection processing, comparing, by the responding node, the payload data in the obtained NAT detection request message or in the obtained NAT detection result request message with a corresponding content in a first IP header of the NAT detection request packet message, and determining, by the responding node, a NAT detection result according to a comparison result;
  when the responding node obtains the NAT detection request message from the NAT detection request packet message after the de-protection processing, obtaining, by the responding node, second node information which includes an IP address of the responding node, and an IP address of the requesting node that is obtained from the first IP header of the NAT detection request packet message, using, by the responding node, the second node information as payload data of a NAT detection response message, performing, by the responding node, IP message encapsulation on the NAT detection response message, performing, by the responding node, protection processing on a NAT detection response packet message obtained after the encapsulation, and sending, by the responding node, the NAT detection response packet message after the protection processing to the requesting node; or, when the responding node obtains the NAT detection result request message from the NAT detection request packet message after the de-protection processing, carrying, by the responding node, a NAT detection result in a NAT detection result response message, performing, by the responding node, IP message encapsulation on the NAT detection result response message, performing, by the responding node, protection processing on a NAT detection response packet message obtained after the encapsulation, and sending, by the responding node, the NAT detection response packet message after the protection processing to the requesting node; and
  receiving, by the requesting node, the NAT detection response packet message; performing, by the requesting node, de-protection processing on the NAT detection response packet message; and when the requesting node obtains the NAT detection result response message from the NAT detection response packet message after the de-protection processing, obtaining, by the requesting node, the NAT detection result from the NAT detection result response message; or, when the requesting node obtains the NAT detection response message from the NAT detection response packet message after the de-protection processing, obtaining, by the requesting node, the payload data of the NAT detection response message, comparing, by the requesting node, the obtained payload data with a corresponding content in a second IP header of the NAT detection response packet message, and determining, by the requesting node, the NAT detection result according to a comparison result.

Optionally, the first node information further includes a port number of the requesting node, and a port number of the configured responding node; or, the first node information further includes a Session Identifier, SID of the requesting node, and a SID of the configured responding node; and the second node information further includes the port number of the responding node, and the port number of the requesting node obtained from the first IP header of the NAT detection request packet message; or, the second node information further includes the SID of the responding node, and the SID of the requesting node obtained from the first IP header of the NAT detection request packet message.

Optionally, the performing, by the requesting node, IP message encapsulation on the NAT detection request message or the NAT detection result request message, includes:
  encapsulating, by the requesting node, the first node information into the first IP header of the NAT detection request packet message; and
  encapsulating, by the requesting node, the NAT detection request message or the NAT detection result request message into a first message content of the NAT detection request packet message; and the performing, by the responding node, IP message encapsulation on the NAT detection response message or the NAT detection result response message, includes:
  encapsulating, by the responding node, the second node information into the second IP header of the NAT detection response packet message; and
  encapsulating, by the responding node, the NAT detection response message or the NAT detection result response message into a second message content of the NAT detection response packet message.

Optionally, the NAT detection request message or the NAT detection result request message or the NAT detection response message includes an identifier indicating a message type and length information for parsing a quantity of IP addresses; and the NAT detection result response message includes an identifier indicating whether a NAT exists between the requesting node and the responding node.

Optionally, the performing, by the requesting node, protection processing on the NAT detection request packet message, includes:
  performing, by the requesting node, at least one of encryption, data obfuscation, or integrity verification on the NAT detection request packet message; and
  the performing, by the responding node, de-protection processing on the NAT detection request packet message, includes:
  performing, by the responding node, at least one of decryption, data restoration, or integrity verification on the NAT detection request packet message.

Optionally, the performing, by the responding node, protection processing on the NAT detection response packet message, includes:
  performing, by the responding node, at least one of encryption, data obfuscation, or integrity verification on the NAT detection response packet message; and
  the performing, by the requesting node, de-protection processing on the NAT detection response packet message, includes:
  performing, by the requesting node, at least one of decryption, data restoration, or integrity verification on the NAT detection response packet message.

Optionally, the determining, by the responding node, the NAT detection result according to the comparison result, includes any of the following:
  when the IP address of the requesting node in the obtained payload data is different from the IP address of the requesting node in the first IP header, or when the port number of the requesting node in the payload data is different from the port number of the requesting node in the first IP header, or when the SID of the requesting node in the payload data is different from the SID of the requesting node in the first IP header, determining, by the responding node, that a NAT exists between the requesting node and a network; otherwise, determining, by the responding node, that no NAT exists between the requesting node and the network; or
  when the IP address of the responding node in the obtained payload data is different from the IP address of the responding node in the first IP header, or when the port number of the responding node in the payload data is different from the port number of the responding node in the first IP header, or when the SID of the responding node in the payload data is different from the SID of the responding node in the first IP header, determining, by the responding node, that a NAT exists between the responding node and a network; otherwise, determining, by the responding node, that no NAT exists between the responding node and the network.

Optionally, the determining, by the requesting node, the NAT detection result according to the comparison result, includes:
  when the IP address of the responding node in the obtained payload data is different from the IP address of the responding node in the second IP header, or when the port number of the responding node in the payload data is different from the port number of the responding node in the second IP header, or when the SID of the responding node in the payload data is different from the SID of the responding node in the second IP header, determining, by the requesting node, that a NAT exists between the responding node and a network; otherwise, determining, by the requesting node, that no NAT exists between the responding node and the network; or
  when the IP address of the requesting node in the obtained payload data is different from the IP address of the requesting node in the second IP header, or when the port number of the requesting node in the payload data is different from the port number of the requesting node in the second IP header, or when the SID of the requesting node in the payload data is different from the SID of the requesting node in the second IP header, determining, by the requesting node, that a NAT exists between the requesting node and a network; otherwise, determining, by the requesting node, that no NAT exists between the requesting node and the network.

Optionally, the NAT detection result determined by the requesting node or the responding node according to the comparison result is a second detection result, and the NAT detection result carried in the NAT detection result response message is a first detection result;
  the first detection result is a detection result indicating whether a NAT exists between the requesting node and the responding node; and
  the second detection result includes a detection result indicating whether an NAT exists between the requesting node and the responding node, and a distribution position of the NAT when the NAT exists between the requesting node and the responding node.

In a second aspect, embodiments of the present disclosure also provide an inter-network-node NAT detection device, configured at a requesting node and including:
  an obtaining module, configured to obtain first node information, and use the obtained first node information as payload data of a NAT detection request message or a NAT detection result request message, wherein the first node information includes t an internet protocol (IP) address of the requesting node and an IP address of a configured responding node;

an encapsulation module, configured to perform IP message encapsulation on the NAT detection request message or the NAT detection result request message, perform protection processing on a NAT detection request packet message obtained after the encapsulation, and send the NAT detection request packet message after the protection processing to the responding node; and a determining module, configured to receive the NAT detection response packet message; perform de-protection processing on the NAT detection response packet message; and when a NAT detection result response message is obtained from the NAT detection response packet message after the de-protection processing, obtain a NAT detection result from the NAT detection result response message; or, when the NAT detection response message is obtained from the NAT detection response packet message after the de-protection processing, obtain the payload data of the NAT detection response message, compare the obtained payload data with a corresponding content in a second IP header of the NAT detection response packet message, and determine a NAT detection result according to a comparison result.

In a third aspect, embodiments of the present disclosure also provide an inter-network-node NAT detection device, configured at a responding node and including:

a receiving module, configured to receive a NAT detection request packet message, and perform de-protection processing on the received NAT detection request packet message;

a determining module, configured to obtain a NAT detection request message or a NAT detection result request message from the NAT detection request packet message after the de-protection processing, compare payload data in the obtained NAT detection request message or in the obtained NAT detection result request message with a corresponding content in a first IP header of the NAT detection request packet message, and determine a NAT detection result according to a comparison result; and an obtaining module, configured to, when the NAT detection request message is obtained from the NAT detection request packet message after the de-protection processing, obtain second node information which includes an IP address of the responding node, and an IP address of a requesting node that is obtained from the first IP header of the NAT detection request packet message, use the second node information as payload data of a NAT detection response message, perform IP message encapsulation on the NAT detection response message, perform protection processing on a NAT detection response packet message obtained after the encapsulation, and send the NAT detection response packet message after the protection processing to the requesting node; or, when the NAT detection result request message is obtained from the NAT detection request packet message after the de-protection processing, carry the NAT detection result in a NAT detection result response message, perform IP message encapsulation on the NAT detection result response message, perform protection processing on a NAT detection response packet message obtained after the encapsulation, and send the NAT detection response packet message after the protection processing to the requesting node.

In a fourth aspect, embodiments of the present disclosure also provide an inter-network-node NAT detection device, configured at a requesting node and including: a memory, configured to store program instructions; a processor to call the program instructions stored in the memory, and execute, according to an obtained program, the steps of the inter-network-node NAT detection method provided by the first aspect above.

In a fifth aspect, the embodiment of the present disclosure also provides an inter-network-node NAT detection device, which is configured in a responding node, and the device includes: a memory, configured to store program instructions; a processor, configured to call the program instructions stored in the memory, and execute, according to an obtained program, the steps of the inter-network-node NAT detection method provided by the first aspect above.

In a sixth aspect, embodiments of the present disclosure further provide a computer storage medium, wherein a computer program is stored thereon, when the computer program is executed by a processor, to implement the steps of the inter-network-node NAT detection method provided by the first aspect are implemented above.

DETAILED DESCRIPTION

At this stage, there is no unified solution for NAT detection in the secure communication protocols. Generally, key management protocols are used for NAT detection. For example, IPsec uses the key management protocol IKE (Internet Key Exchange) for NAT detection. However, NAT detection using IKE has the following defects.

The function definition is chaotic and the boundary is blurred, which is not conducive to the expansion of the key management function by using the key management protocol. For example, NAT detection by using IPsec is realized by using the "announcement payload" of the key management protocol IKE. The "announcement payload" is a part of the key management protocol. If the key management function is extended (e.g., to further enhance the security of key management), there is a risk of exposure of internal IP addresses due to the limitation of the supported function of the NAT detection, which reduces the security.

The inter-network-node NAT detection method, apparatus, device and storage medium provided by the embodiments of the present disclosure will be specifically described below in conjunction with the accompanying drawings.

Figure 1:
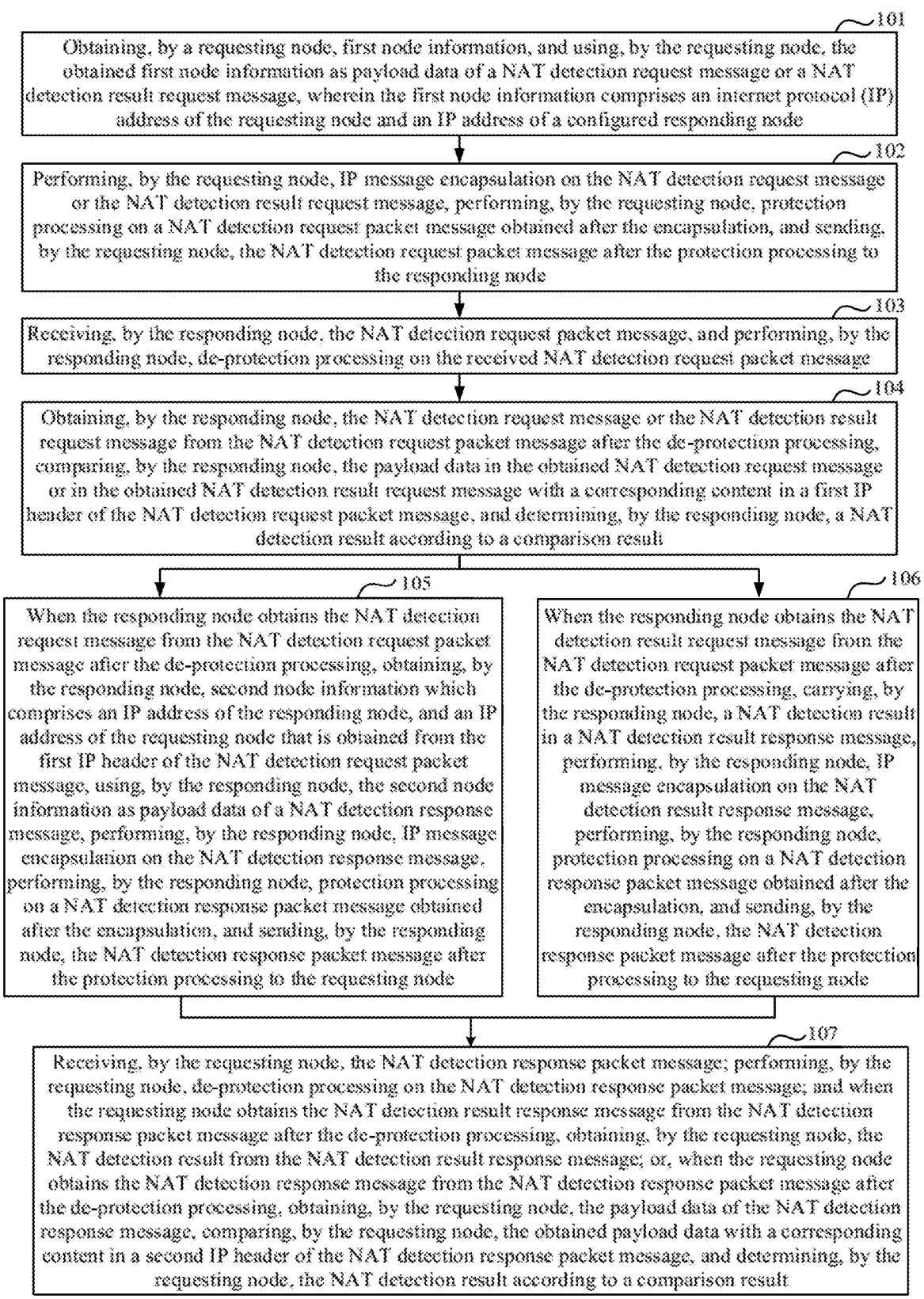
FIG. 1 is a schematic flow diagram of an inter-network-node NAT detection method provided by embodiments of the present disclosure.

An embodiment of the present disclosure provides an inter-network-node NAT detection method, as shown in FIG. 1, including the following.

S101: the requesting node obtains first node information, and uses the obtained first node information as payload data of a NAT detection request message or a NAT detection result request message. The first node information includes an IP address of the requesting node, and an IP address of a configured responding node.

The above NAT detection request message and NAT detection result request message have the same format, and belong to different message types. If the requesting node needs to determine whether a NAT exists and a distribution position of the NAT when the NAT exists, the requesting node needs to send the NAT detection request message to the responding node. If the requesting node only needs to determine whether a NAT exists between the requesting node and the responding node, the requesting node needs to send a NAT detection result request message to the responding node.

Payload data of the NAT detection request message and payload data of the NAT detection result request message are the same, and the content of the payload data includes: the IP address of the requesting node itself, and the IP address of the responding node. However, it should be noted that the address of the responding node can be configured by the administrator, because initially, the requesting node needs to be clearly informed which responding node to send to.

S102: the requesting node performs IP message encapsulation on the NAT detection request message or the NAT detection result request message, and performs protection processing on a NAT detection request packet message obtained after the encapsulation, and sends the NAT detection request packet message after the protection processing to the responding node.

As an optional implementation, when the requesting node needs to send the NAT detection request message to the responding node, the requesting node performs IP message encapsulation on the NAT detection request message, including:

the requesting node encapsulates the first node information into the first IP header of the NAT detection request packet message, and encapsulates the NAT detection request message into a first message content of the NAT detection request packet message.

As another optional implementation, when the requesting node needs to send the NAT detection result request message to the responding node, the requesting node performs IP message encapsulation on the NAT detection result request message, including:

the requesting node encapsulates the first node information into the first IP header of the NAT detection request packet message, and encapsulates the NAT detection result request message into a first message content of the NAT detection request packet message.

It should be noted that, when organizing the NAT detection request packet message, the first node information of the requesting node not only exists in the first IP header, but is also encapsulated in the first message content.

Assuming that the initiating end is the requesting node and the receiving end is the responding node, when the requesting node performs IP message encapsulation, it needs to first organize and form the payload data of the NAT detection request message or the NAT detection result request message of the requesting node, and then performs IP message encapsulation on the NAT detection request message or the NAT detection result request message to form the NAT detection request packet message.

It should be noted that in the present disclosure, the address of the requesting node itself or the responding node itself is called a private address, and the address encapsulated into the header when the requesting node or the responding node transmits a message in the network is called a public address. For the requesting node or the responding node, if the network address translation is performed through the NAT to transmit the message, the public address and the private address are different addresses; if no network address translation is performed to transmit the message, the public address and the private address are same address.

Figure 2:
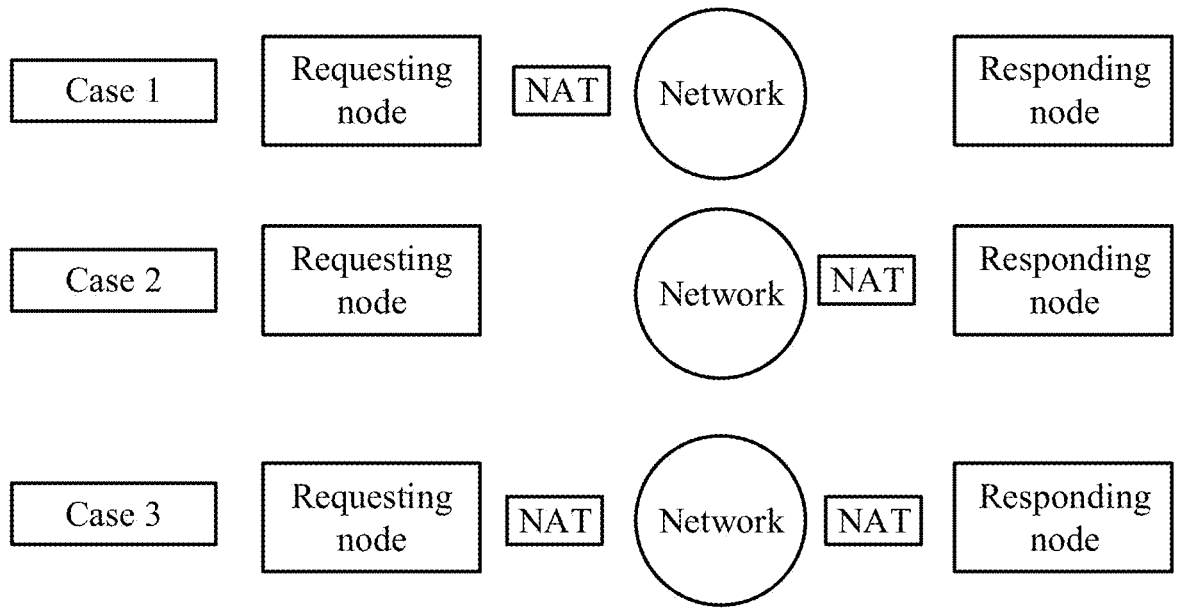
FIG. 2 is a schematic diagram of a NAT distribution position when a NAT exists between a requesting node and a responding node provided by embodiments of the present disclosure.

Refer to a schematic diagram of a NAT distribution position(s) of when there is a NAT(s) between the requesting node(s) and the responding node(s) shown in FIG. 2, including three cases.

Case 1: a NAT exists between the requesting node and a network, and no NAT exists between the responding node and the network.

The IP address of the requesting node encapsulated in the first IP header is a private address, and the IP address of the responding node is a public address of the responding node itself and is also a private address of the responding node. When the NAT detection request packet message that is subjected to protection processing passes through the NAT, the private IP address of the requesting node in the first IP header can be changed to a different public address by the NAT.

Case 2: no NAT exists between the requesting node and the network, and a NAT exists between the responding node and the network.

The IP address of the requesting node encapsulated in the first IP header is a private address of the requesting node, and is also a public address of the requesting node, and the IP address of the responding node is a public address. When the NAT detection request packet message that is subjected to protection processing passes through the NAT, the public IP address of the responding node in the first IP header can be changed to a different private address by the NAT.

Case 3: a NAT exists between the requesting node and the network, and a NAT exists between the responding node and a network.

The IP address of the requesting node encapsulated in the first IP header is a private address, and the IP address of the responding node is a public address. When the NAT detection request packet message that is subjected to protection processing passes through the NAT between the requesting node and the network, the private IP address of the requesting node in the first IP header can be changed to a different public address by the NAT, and when the NAT detection request packet message that is subjected to protection processing passes through the NAT between the responding node and the network, the public IP address of the responding node in the first IP header can be changed to a different private address by the NAT.

If no NAT exists between the requesting node and the responding node, that is, no NAT exists between the requesting node and the network, and no NAT exists between the responding node and the network, then the IP address of the requesting node encapsulated in the first IP header is a private address of the requesting node, and is also a public address used in network transmission, and the IP address of the responding node is a public address of the responding node, and is also a public address used in network transmission.

The above description is just an example to explain the change of the IP address, and the rules for changing the port and SID are the same as those of the IP address, which will not be repeated here.

As an optional implementation, the requesting node performs protection processing on the NAT detection request packet message, including:

the requesting node performs at least one of encryption, data obfuscation, or integrity verification on the NAT detection request packet message. Specifically, the protection processing on the NAT detection request packet message is performed on the first message content in the NAT detection request packet message, and is not performed on the first IP header in the NAT detection request packet message.

It should be noted that the requesting node performs protection processing on the NAT detection request packet message to form a protected NAT detection request packet message. Because the NAT detection request message may contain sensitive information and the protection processing performed on the NAT detection request packet message can prevent sensitive information such as internal private IP addresses and the like from being leaked, the privacy and integrity verification processing on the NAT detection request packet message must be performed during the transmission of the NAT detection request packet message, which can prevent an attacker from launching a DOS attack by tampering with information (e.g., IPsec does not protect NAT detection information, the attacker can launching the DOS attack by deleting or adding NAT-Discovery (NAT-D) payload), and solves the problem of bandwidth waste caused by the attacker tampering with information (e.g., in IPsec, in an environment without NAT, the attacker can cause both negotiation parties to use the user datagram protocol (UDP) encapsulation mode by tampering with the NAT detection message, thereby resulting in bandwidth waste).

S103: the responding node receives the NAT detection request packet message, and performs de-protection processing on the received NAT detection request packet message.

As an optional implementation, the responding node performs de-protection processing on the NAT detection request packet message that is subjected to protection processing, including: the responding node correspondingly performs at least one of decryption, data restoration, or integrity verification on the NAT detection request packet message that is subjected to protection processing.

S104: the responding node obtains the NAT detection request message or the NAT detection result request message from the NAT detection request packet message after the de-protection processing, and compares the payload data in the obtained NAT detection request message or in the obtained NAT detection result request message with a corresponding content in a first IP header of the NAT detection request packet message, and determine a NAT detection result according to a comparison result.

It should be noted that, by comparing the IP address in the first IP header with the IP address in the payload data of the NAT detection request message or the NAT detection result request message, the responding node determines whether the IP address of the requesting node or the responding node is translated through the NAT during network transmission, so as to parse out the NAT detection result between the requesting node and the responding node.

S105: when the responding node obtains the NAT detection request message from the NAT detection request packet message after the de-protection processing, the responding node obtains second node information which includes an IP address of the responding node, and an IP address of the requesting node that is obtained from the first IP header of the NAT detection request packet message, uses the second node information as payload data of a NAT detection response message, performs IP message encapsulation on the NAT detection response message, and performs protection processing on a NAT detection response packet message obtained after the encapsulation, and sends the NAT detection response packet message after the protection processing to the requesting node.

S106: when the responding node obtains the NAT detection result request message from the NAT detection request packet message after the de-protection processing, the responding node carries a NAT detection result in a NAT detection result response message, performs IP message encapsulation on the NAT detection result response message, performs protection processing on a NAT detection response packet message obtained after the encapsulation, and sends the NAT detection response packet message after the protection processing to the requesting node.

As an optional implementation, the responding node performs IP message encapsulation on the NAT detection response message or the NAT detection result response message, including:

the responding node encapsulates the second node information into the second IP header of the NAT detection response packet message, and encapsulates the NAT detection response message or the NAT detection result response message into a second message content of the NAT detection response packet message.

It should be noted that, when organizing the NAT detection response packet message, the second node information of the responding node not only exists in the second IP header, but is also encapsulated in the second message content.

When the responding node performs IP message encapsulation, it needs to first organize and form the payload data of the NAT detection response message or the NAT detection result response message of the responding node, and then performs IP message encapsulation on the NAT detection response message or the NAT detection result response message to form the NAT detection response packet message.

It should be noted that when the NAT exists between the responding node and the requesting node, the distribution position of the NAT includes three cases, which are specifically referred to the description of the corresponding content of S102 (FIG. 2), which will not be repeated here.

As an optional implementation, the responding node performs protection processing on the NAT detection response packet message, including:

the responding node performs at least one of encryption, data obfuscation, or integrity verification on the NAT detection response packet message. The protection processing on the NAT detection response packet message refers to performing protection processing on the second message content in the NAT detection response packet message, and not performing protection processing on the second IP header in the NAT detection response packet message.

It should be noted that the purpose of the protection processing is consistent with the protection processing performed by the requesting node on the NAT detection request packet message, which will not be repeated here.

S107: the requesting node receives the NAT detection response packet message, performs de-protection processing on the NAT detection response packet message, and when the requesting node obtains the NAT detection result response message from the NAT detection response packet message after the de-protection processing, obtains the NAT detection result from the NAT detection result response message; or, when the requesting node obtains the NAT detection response message from the NAT detection response packet message after the de-protection processing, obtains the payload data of the NAT detection response message, compares the obtained payload data with a corresponding content in a second IP header of the NAT detection response packet message, and determines the NAT detection result according to a comparison result.

It should be noted that, in the actual application scenario, the NAT detection request message or the NAT detection result request message can be encapsulated in the NAT detection request packet message sent by the requesting node to the responding node, so the responding node, according to the actual case, only needs to execute S105 or S106, and correspondingly, in S107, the requesting node only needs to obtain the NAT detection result through one of the manners according to the actual case.

As an optional implementation, the requesting node performs de-protection processing on the NAT detection response packet message that is subjected to the protection processing, including: the requesting node correspondingly performs at least one of decryption, data restoration, or integrity verification on the NAT detection response packet message that is subjected to the protection processing.

As an optional implementation, the first node information further includes ta port number of the requesting node, and a port number of the configured responding node; or, the first node information further includes a SID of the requesting node, and a SID of the configured responding node.

As an optional implementation, correspondingly, the second node information further includes the port number of the responding node, and the port number of the requesting node obtained from the first IP header of the NAT detection request packet message; or, the second node information further includes the SID of the responding node, and the SID of the requesting node obtained from the first IP header of the NAT detection request packet message.

It should be noted that the IP address, port number, and SID of the responding node represent addresses through which data can be sent to the responding node. In addition to supporting protocols with PORT (ports), NAT detection also supports protocols without port(s). Some protocols do not have ports, but have SIDs, such as the SID detection that supports the tunnel universal encapsulating (TUE), then the responding node can determine whether a NAT exists according to the change of any one of the IP address, port or SID carried in the first IP header, and the requesting node can determine whether a NAT exists according to the change any one of the IP address, port and SID carried in the second IP header.

The present disclosure provides a NAT detection method that exists independently of the key management protocol, which is simple and reliable, and solves the problem of difficult expansion of the key management function caused by the unction definition confusion and blurred boundaries which is caused by the tight coupling between the inter-network-node NAT detection and the key management protocol (e.g., in the embodiments, the NAT detection capability is completed by a protocol that carries the IP address, or the IP address and the port number, or the IP address and the SID, which has nothing to do with the key management protocol, the key management is completed by a special key management protocol, and the strengthening and expansion of key management security will not be affected by the NAT detection capability). In addition, in the embodiments, the NAT detection is realized by an independent protocol, not by modifying the key management protocol itself, and modifying the NAT detection capability will not affect the security capability of the key management protocol itself; the diversity of NAT detection methods is supported, and different detection manners of only determining whether a NAT exists or determining the distribution position of the NAT are supported. When only determining whether a NAT exists, the responding node only feeds back the NAT detection result, which reduces traffic and is more suitable for the traffic-sensitive network environment. The protection for the NAT detection process is supported, which prevents internal address from being leaked, and prevents the attacker from modifying the detection message to cause the DOS attack or network resource waste, and strengthens the overall security of the system.

As an optional implementation, the NAT detection request message or the NAT detection result request message or the NAT detection response message includes an identifier indicating a message type and length information for parsing a quantity of IP addresses. The above three messages can be distinguished by the identifier of the message type. The NAT detection result response message includes an identifier indicating whether a NAT exists between the requesting node and the responding node. According to the identifier indicating whether a NAT exists between the requesting node and the responding node, the message type is the NAT detection result response message can be determined, and whether a NAT exists can be determined.

It should be noted that the length information may include the length of the payload data, or the payload data may include the quantity of addresses of the requesting node/responding node, or the length of the message. The quantity of IP addresses can be parsed out through different types of length information.

As an optional implementation, formats of the NAT detection request message/NAT detection response message/NAT detection result request message/NAT detection result response message includes the following fields.

The identifier field has multiple values, and the definitions of the values are shown in Table 1 below.

TABLE 1

Definition of identifier field value

| Identifier field value | Definition |
|---|---|
| 1 | NAT detection request message |
| 2 | NAT detection response message |
| 3 | NAT detection result request message |
| 4 | NAT detection result response message (without NAT) |
| 5 | NAT detection result response message (with NAT) |
| Remaining | Reserve |

Hereinbefore, the value of the identifier of the indication message type in the NAT detection request message is 1, the value of the identifier of the indication message type in the NAT detection response message is 2, and the value of the identifier of the indication message type in the NAT detection result request message is 3. If no NAT exists, the value of the identifier in the NAT detection result response message is 4, and if a NAT exists, the value of the identifier in the NAT detection result response message is 5.

The length information field is an optional field, and the quantity of IP addresses in the payload data can be parsed out through the length field.

For example, in a multi-homing environment, the requesting node or the responding node may have multiple active and available IP addresses simultaneously, so the information of these IP addresses should be included when constructing the NAT detection request message or NAT detection response message or NAT detection result request message. When the value of the identifier field is 1, 2, or 3, the length information field used for parsing the quantity of IP addresses is a required field. When the value of the identifier field is 4 or 5, the length information field is invalid.

The payload data field is an optional field with a variable length, and represents the payload data of the NAT detection request message/NAT detection response message/NAT detection result request message. When the value of the identifier field is 1, 2, or 3, the payload data field is a required field. When the value of the identifier field is 4 or 5, the payload data field is invalid.

Exemplarily, the payload data field is used as the payload data of the NAT detection request message or the NAT detection result request message or the NAT detection response message, and the specific format is shown in the following table.

| DST_PORT(SID) | DST_IP | SRC_PORT(SID) | SRC_IP1 \| SRC_IP2 \|...\| SRC_IPn |
|---|---|---|---|

DST_PORT (SID) represents the peer port number or peer SID in the NAT detection request message or NAT detection result request message or NAT detection response message, is an optional field with a length of 2 octets group. If the current environment is IPV4, this field is mandatory; and if the current environment is IPV6, this field does not exist.

DST_IP represents the peer IP address in the NAT detection request message or NAT detection result request message or NAT detection response message. The length of this field depends on the IP version of the current communication. If IPv4 communication is currently used, the length is 4 octets group; and if IPv6 communication is currently used, the length is 16 octets group.

SRC_PORT (SID) represents the source port number or source SID in the NAT detection request message or NAT detection result request message or NAT detection response message, and is an optional field with a length of 2 octets group. If the current environment is IPV4, this field is mandatory; and if the current environment is IPV6, this field does not exist.

SRC_IP1|SRC_IP2| . . . | SRC_IPn: represents the local IP address available for current communication, the length of which depends on the IP version of the current communication and the quantity (n) of available IP addresses. If IPv4 communication is currently used, the length is 4*n octets group; and if IPv6 communication is currently used, the length is 16*n octets group. "|" represents a connector.

For example, when one local IP address is available, n is equal to 1. For the requesting node, SRC_IPn is the IP address of the requesting node, SRC_PORT (SID) is the port number of the requesting node or the SID of the requesting node, DST_IP is the IP address of the responding node, and DST_PORT (SID) is the port number or SID of the responding node. For the responding node, SRC_IPn is the IP address of the responding node, SRC_PORT (SID) is the port number or SID of the responding node, DST_IP is the IP address of the requesting node, and DST_PORT (SID) is the port number or SID of the requesting node. It should be noted that one or more SRC_IPs cannot exist in IPV4 and IPV6 simultaneously, and must be only IPv4 or only IPV6, which is depends on the IP version of the current communication. One node may have one or more local IP addresses, but which IP address to be used in the communication process is not known in advance, and can only be known after the communication is completed.

Combining with cases that the quantities of source IP addresses in the NAT detection request messages are different, a possible implementation in which the corresponding responding node determines the NAT detection result according to the comparison result is given below.

1. When the sending end is the requesting node and the receiving end is the responding node, the quantity of IP addresses of the requesting node in the NAT detection request message is 1, and the responding node determines the NAT detection result according to the comparison result, including any of the following steps.

Step A: when the IP address of the requesting node in the payload data obtained by the responding node is different from the IP address of the requesting node in the first IP header, or, when the port number of the requesting node in the obtained payload data is different from the port number of the requesting node in the first IP header, or, when the SID of the requesting node in the obtained payload data is different from the SID of the requesting node in the first IP header, it is determined that a NAT exists between the requesting node and the network; otherwise, it is determined that no NAT exists between the requesting node and the network.

It should be noted that when the requesting node organizes the payload data, the quantity of IP addresses of the requesting node is 1. When the responding node parses out to meet any of the following conditions during the comparison process, it is determined that a NAT exists between the requesting node and the network.

1) When the IP address of the requesting node is stored in the first node information which is served as the payload data, the IP address of the requesting node in the payload data is different from the IP address of the requesting node in the first IP header.

2) When the IP address and port number of the requesting node are stored in the first node information which is served as the payload data, the IP address of the requesting node in the payload data is different from the IP address of the requesting node in the first IP header, and/or, The port number of the requesting node in the payload data is different from the port number of the requesting node in the first IP header.

3) When the IP address and SID of the requesting node are stored in the first node information which is served as the payload data, the IP address of the requesting node in the payload data is different from the IP address of the requesting node in the first IP header, and/or, the SID of the requesting node in the payload data is different from the SID of the requesting node in the first IP header.

Step B: when the IP address of the responding node in the payload data obtained by the responding node is different from the IP address of the responding node in the first IP header, or, when the port number of the responding node in the obtained payload data is different from the port number of the responding node in the first IP header, or, when the SID of the responding node in the obtained payload data is different from the SID of the responding node in the first IP header, it is determined that a NAT exists between the responding node and the network; otherwise, it is determined that no NAT exists between the responding node and the network.

It should be noted that when the requesting node organizes the payload data, the quantity of IP addresses of the requesting node is 1. When the responding node parses out to meet any of the following conditions during the comparison process, it is determined that a NAT exists between the responding node and the network.

1) When the IP address of the responding node is stored in the first node information which is served as the payload data, the IP address of the responding node in the payload data is different from the IP address of the responding node in the first IP header.

2) When the IP address and port number of the responding node are stored in the first node information which is served as the payload data, the IP address of the responding node in the payload data is different from the IP address of the responding node in the first IP header, and/or, the port number of the responding node in the payload data is different from the port number of the responding node in the first IP header.

3) When the IP address and SID of the responding node are stored in the first node information which is served as the payload data, the IP address of the responding node in the payload data is different from the IP address of the responding node in the first IP header, and/or, the SID of the responding node in the payload data is different from the SID of the responding node in the first IP header.

2. When the sending end is the requesting node and the receiving end is the responding node, the quantity of IP addresses of the requesting node in the NAT detection request message is greater than 1, and the responding node determines the NAT detection result according to the comparison result, including any of the following steps.

Step A: when all the IP addresses of the requesting node in the payload data obtained by the responding node are different from the IP addresses of the requesting node in the first IP header, or, when the port numbers of the requesting node in the obtained payload data are different from the port numbers of the requesting node in the first IP header, or, when the SIDs of the requesting node in the obtained payload data are different from the SIDs of the requesting node in the first IP header, it is determined that a NAT exists between the requesting node and the network; otherwise, it is determined that no NAT exists between the requesting node and the network.

Hereinbefore, all IP addresses of the requesting node are encapsulated in the first message content, and the system only adds one IP address to be used in the first IP header when sending. When the responding node parses out to meet any of the following conditions during the comparison process, it is determined that a NAT exists between the requesting node and the network.

1) When all IP addresses of the requesting node are stored in the first node information which is served as the payload data, all IP addresses of the requesting node in the payload data are different from the IP addresses of the requesting node in the first IP header.

2) When all the IP addresses and port numbers of the requesting node are stored in the first node information which is served as the payload data, all the IP addresses of the requesting node in the payload data are different from the IP addresses of the requesting node in the first IP header, and/or, the port numbers of the requesting node in the payload data are different from the port numbers of the requesting node in the first IP header.

3) When all the IP addresses and SIDs of the requesting node are stored in the first node information which is served as the payload data, all the IP addresses of the requesting node in the payload data are different from the IP addresses of the requesting node in the first IP header, and/or, the SIDs of the requesting node in the payload data are different from the SIDs of the requesting node in the first IP header.

Step B: when the IP address of the responding node in the payload data obtained by the responding node is different from the IP address of the responding node in the first IP header, or, when the port number of the responding node in the obtained payload data is different from the port number of the responding node in the first IP header, or, when the SID of the responding node in the obtained payload data is different from the SID of the responding node in the first IP header, it is determined that a NAT exists between the responding node and the network; otherwise, it is determined that no NAT exists between the responding node and the network.

The specific explanations are referred to the comparison process of responding node information in the payload data when the quantity of IP addresses of the requesting node is 1 when the requesting node organizes the payload data above, which will not be repeated here.

There are two manners for the requesting node to obtain the final NAT detection result. Manner 1: when the responding node feeds back the NAT detection response message to the requesting node, the requesting node determines the NAT detection result according to the comparison result. Manner 2: if the responding node feeds back the NAT detection result response message to the requesting node, the requesting node obtains the NAT detection result directly from the NAT detection result response message.

Combining with the cases that the quantities of source IP addresses in the NAT detection response messages are different, a possible implementation in which the corresponding requesting node determines the NAT detection result according to the comparison result is given below.

1. When the sending end is the responding node and the receiving end is the requesting node, the quantity of IP addresses of the responding node in the NAT detection response message is 1, and the requesting node determines the NAT detection result according to the comparison result, including the following.

Step A: when the IP address of the responding node in the payload data obtained by the requesting node is different from the IP address of the responding node in the second IP header, or, when the port number of the responding node in the obtained payload data is different from the port number of the responding node in the second IP header, or when the SID of the responding node in the obtained payload data is different from the SID of the responding node in the second IP header, it is determined that a NAT exists between the responding node and the network; otherwise, it is determined that no NAT exists between the responding node and the network.

It should be noted that when the responding node organizes the payload data, the quantity of IP addresses of the responding node is 1. When the requesting node parses out to meet any of the following conditions during the comparison process, it is determined that a NAT exists between the responding node and the network.

1) When the IP address of the responding node is stored in the second node information which is served as the payload data, the IP address of the responding node in the payload data is different from the IP address of the responding node in the second IP header.

2) When the IP address and port number of the responding node are stored in the second node information which is served as the payload data, the IP address of the responding node in the payload data is different from the IP address of the responding node in the second IP header, and/or, the port number of the responding node in the payload data is different from the port number of the responding node in the second IP header.

3) When the IP address and SID of the responding node are stored in the second node information which is served as the payload data, the IP address of the responding node in the payload data is different from the IP address of the responding node in the second IP header, and/or, the SID of the responding node in the payload data is different from the SID of the responding node in the second IP header.

Step B: when the IP address of the requesting node in the payload data obtained by the requesting node is different from the IP address of the requesting node in the second IP header, or, when the port number of the requesting node in the obtained payload data is different from the port number of the requesting node in the second IP header, or, when the SID of the requesting node in the obtained payload data is different from the SID of the requesting node in the second IP header, it is determined that a NAT exists between the requesting node and the network; otherwise, it is determined that no NAT exists between the requesting node and the network.

It should be noted that when the responding node organizes the payload data, the quantity of IP addresses of the responding node is 1. When the requesting node parses out to meet any of the following conditions during the comparison process, it is determined that a NAT exists between the requesting node and the network.

1) When the IP address of the requesting node is stored in the second node information which is served as the payload data, the IP address of the requesting node in the payload data is different from the IP address of the requesting node in the second IP header.

2) When the IP address and port number of the requesting node are stored in the second node information which is served as the payload data, the IP address of the requesting node in the payload data is different from the IP address of the requesting node in the second IP header, and/or, the port number of the requesting node in the payload data is different from the port number of the requesting node in the second IP header.

3) When the IP address and SID of the requesting node are stored in the second node information which is served as the payload data, the IP address of the requesting node in the payload data is different from the IP address of the requesting node in the second IP header, and/or, the SID of the requesting node in the payload data is different from the SID of the requesting node in the second IP header.

2. When the sending end is the responding node and the receiving end is the requesting node, and the quantity of IP addresses of the responding node in the NAT detection response message is greater than 1, the requesting node determines the NAT detection result according to the comparison result, including the following.

Step A: when all the IP addresses of the responding node in the payload data obtained by the requesting node are different from the IP addresses of the responding node in the second IP header, or, when the port numbers of the responding node in the obtained payload data are different from the port numbers in the second IP header, or, when the SIDs of the responding node in the obtained payload data are different from the SIDs of the responding node in the second IP header, it is determined that a NAT exists between the responding node and the network; otherwise, it is determined that no NAT exists between the responding node and the network.

Hereinbefore, all IP addresses of the responding node are encapsulated in the second message content, and the system only adds one IP address to be used in the second IP header when sending. When the requesting node parses out to meet any of the following conditions during the comparison process, it is determined that a NAT exists between the responding node and the network.

1) When all IP addresses of the responding node are stored in the second node information which is served as the payload data, all IP addresses of the responding node in the payload data are different from the IP addresses of the responding node in the second IP header.

2) When all the IP addresses and port numbers of the responding node are stored in the second node information which is served as the payload data, all the IP addresses of the responding node in the payload data are different from the IP addresses of the responding node in the second IP header, and/or, the port numbers of the responding node in the payload data are different from the port numbers of the responding node in the second IP header.

3) When all the IP addresses and SIDs of the responding node are stored in the second node information which is served as the payload data, all the IP addresses of the responding node in the payload data are different from the IP addresses of the responding node in the second IP header, and/or, the SIDs of the responding node in the payload data are different from the SIDs of the responding node in the second IP header.

Step B: when the IP address of the requesting node in the payload data obtained by the requesting node is different from the IP address of the requesting node in the second IP header, or, when the port number of the requesting node in the obtained payload data is different from the port number of the requesting node in the second IP header, or, when the SID of the requesting node in the obtained payload data is different from the SID of the requesting node in the second IP header, it is determined that a NAT exists between the requesting node and the network; otherwise, it is determined that no NAT exists between the requesting node and the network.

The specific explanations are referred to the comparison process of requesting node information in the payload data when the quantity of IP addresses of the responding node is 1 when the responding node organizes the payload data, which will not be repeated here.

It should be noted that it is not necessary to save all the NAT detection result information, but for the subsequent encapsulation and communication of the data security channel, the responding node can selectively save the NAT detection result information, and obtain the first detection result or the second detection result according to the selectively saved different NAT detection result information. The NAT detection result determined by the requesting node or the responding node according to the comparison result is the second detection result, and the detection result carried in the NAT detection result response message is the first detection result.

Hereinbefore, the first detection result is a detection result indicating whether a NAT exists between the requesting node and the responding node; and the second detection result includes a detection result indicating whether a NAT exists between the requesting node and the responding node, and a distribution position of the NAT when the NAT exists between the requesting node and the responding node.

As an optional implementation, for the responding node, when the IP address of the requesting node in the obtained payload data is different from the IP address of the requesting node in the first IP header, but the port number/SID of the requesting node in the payload data is the same as the port number/SID of the requesting node in the first IP header, the corresponding log information is generated during the detection process and saved.

Alternatively, when the IP address of the responding node in the obtained payload data is different from the IP address of the responding node in the first IP header, but the port number/SID of the responding node in the payload data is the same as the port number/SID of the responding node in the first IP header, the corresponding log information is generated during the detection process and saved.

It should be noted that when the IP address of the requesting node in the payload data obtained by the responding node from the NAT detection request packet message is different from the IP address of the requesting node in the first IP header, conventionally it can be proved that a NAT exists between the requesting node and the network. However, when the port number or SID of the requesting node in the payload data is the same as the port number or SID of the requesting node in the first IP header, the NAT mapping failure may occur, and the present disclosure classifies this situation as the NAT between the requesting node and the network does not support traversal. When the requesting node sends a message to the responding node, the NAT between the requesting node and the network can change the port number or SID of the requesting node to the port number or SID of the NAT, but the port number or SID of the requesting node in the first IP header is not changed. That is, the NAT between the requesting node and the network may fail to perform address mapping (for example, NAT does not support UDP traversal). By this way, corresponding log information needs to be generated and saved. In order for the administrator to check the logs later, and the situation that NAT traversal is not supported are checked.

Figure 3:
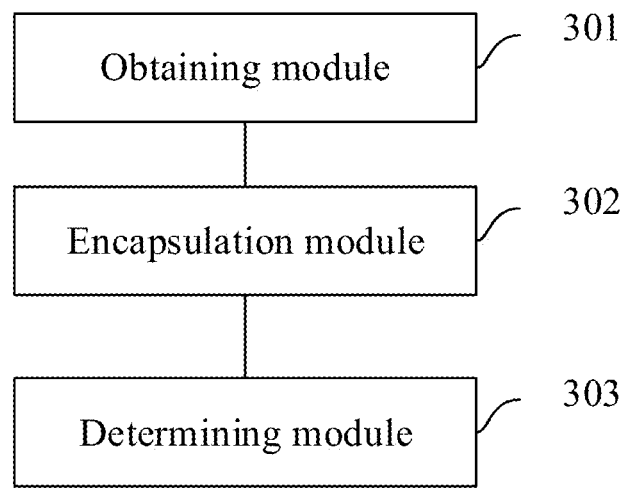
FIG. 3 is a schematic structural diagram of a NAT detection apparatus configured at a requesting node provided by embodiments of the present disclosure.

Based on the same inventive concept, some embodiments of the present disclosure also provide an inter-network-node NAT detection apparatus, which is configured at a requesting node, as shown in FIG. 3, including:

an obtaining module 301, configured to obtain first node information, and use the obtained first node information as payload data of a NAT detection request message or a NAT detection result request message, wherein the first node information includes t an internet protocol (IP) address of the requesting node and an IP address of a configured responding node;

an encapsulation module 302, configured to perform IP message encapsulation on the NAT detection request message or the NAT detection result request message, perform protection processing on a NAT detection request packet message obtained after the encapsulation, and send the NAT detection request packet message after the protection processing to the responding node; and a determining module 303, configured to receive the NAT detection response packet message; perform de-protection processing on the NAT detection response packet message; and when a NAT detection result response message is obtained from the NAT detection response packet message after the de-protection processing, obtain a NAT detection result from the NAT detection result response message; or, when the NAT detection response message is obtained from the NAT detection response packet message after the de-protection processing, obtain the payload data of the NAT detection response message, compare the obtained payload data with a corresponding content in a second IP header of the NAT detection response packet message, and determine a NAT detection result according to a comparison result.

Optionally, the first node information further includes a port number of the requesting node, and a port number of the configured responding node; or, the first node information further includes a SID of the requesting node, and a SID of the configured responding node.

Optionally, the encapsulation module 302 performing IP message encapsulation on the NAT detection request message or the NAT detection result request message, includes:

encapsulating the first node information into the first IP header of the NAT detection request packet message; and encapsulating the NAT detection request message or the NAT detection result request message into a first message content of the NAT detection request packet message.

Optionally, the NAT detection request message or the NAT detection result request message or the NAT detection response message includes an identifier indicating a message type and length information for parsing a quantity of IP addresses; and the NAT detection result response message includes an identifier indicating whether a NAT exists between the requesting node and the responding node.

Optionally, the encapsulation module 302 performing protection processing on the NAT detection request packet message, includes:

the encapsulation module 302 performing at least one of encryption, data obfuscation, or integrity verification on the NAT detection request packet message.

Optionally, the determining module 303 performing de-protection processing on the NAT detection response packet message, includes:

the determining module 303 performing at least one of decryption, data restoration, or integrity verification on the NAT detection response packet message.

Optionally, the determining module 303 determining the NAT detection result according to the comparison result, includes:

when the IP address of the responding node in the obtained payload data is different from the IP address of the responding node in the second IP header, or when the port number of the responding node in the payload data is different from the port number of the responding node in the second IP header, or when the SID of the responding node in the payload data is different from the SID of the responding node in the second IP header, determining that a NAT exists between the responding node and a network; otherwise, determining that no NAT exists between the responding node and the network; or when the IP address of the requesting node in the obtained payload data is different from the IP address of the requesting node in the second IP header, or when the port number of the requesting node in the payload data is different from the port number of the requesting node in the second IP header, or when the SID of the requesting node in the payload data is different from the SID of the requesting node in the second IP header, determining that a NAT exists between the requesting node and a network; otherwise, determining that no NAT exists between the requesting node and the network.

Optionally, the NAT detection result determined by the determining module 303 according to the comparison result is a second detection result, and the NAT detection result carried in the NAT detection result response message is a first detection result;

the first detection result is a detection result indicating whether a NAT exists between the requesting node and the responding node; and the second detection result includes a detection result indicating whether a NAT exists between the requesting node and the responding node, and a distribution position of the NAT when the NAT exists between the requesting node and the responding node.

Figure 4:
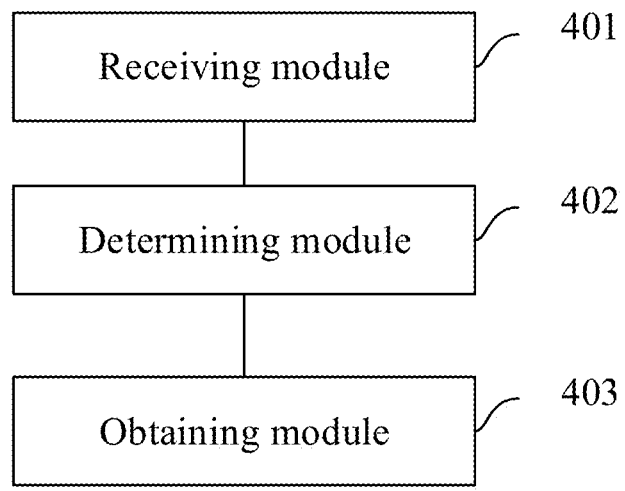
FIG. 4 is a schematic structural diagram of a NAT detection apparatus configured at a responding node provided by embodiments of the present disclosure.

Some embodiments of the present disclosure also provide an inter-network-node NAT detection apparatus, which is configured at a responding node, as shown in FIG. 4, including:

a receiving module 401, configured to receive a NAT detection request packet message, and perform de-protection processing on the received NAT detection request packet message;

a determining module 402, configured to obtain a NAT detection request message or a NAT detection result request message from the NAT detection request packet message after the de-protection processing, compare payload data in the obtained NAT detection request message or in the obtained NAT detection result request message with a corresponding content in a first IP header of the NAT detection request packet message, and determine a NAT detection result according to a comparison result; and an obtaining module 403, configured to, when the NAT detection request message is obtained from the NAT detection request packet message after the de-protection processing, obtain second node information which includes an IP address of the responding node, and an IP address of a requesting node that is obtained from the first IP header of the NAT detection request packet message, use the second node information as payload data of a NAT detection response message, perform IP message encapsulation on the NAT detection response message, perform protection processing on a NAT detection response packet message obtained after the encapsulation, and send the NAT detection response packet message after the protection processing to the requesting node; or, when the NAT detection result request message is obtained from the NAT detection request packet message after the de-protection processing, carry the NAT detection result in a NAT detection result response message, perform IP message encapsulation on the NAT detection result response message, perform protection processing on a NAT detection response packet message obtained after the encapsulation, and send the NAT detection response packet message after the protection processing to the requesting node.

Optionally, the second node information further includes the port number of the responding node, and the port number of the requesting node obtained from the first IP header of the NAT detection request packet message; or, the second node information further includes the SID of the responding node, and the SID of the requesting node obtained from the first IP header of the NAT detection request packet message.

Optionally, the obtaining module 403 performing IP message encapsulation on the NAT detection response message or the NAT detection result response message, includes:

encapsulating, the second node information into the second IP header of the NAT detection response packet message; and encapsulating the NAT detection response message or the NAT detection result response message into a second message content of the NAT detection response packet message.

Optionally, the receiving module 401 performing de-protection processing on the NAT detection request packet message, includes:

the receiving module 401 performing at least one of decryption, data restoration, or integrity verification on the NAT detection request packet message.

Optionally, the obtaining module 403 performing protection processing on the NAT detection response packet message, includes:

the obtaining module 403 performing at least one of encryption, data obfuscation, or integrity verification on the NAT detection response packet message.

Optionally, the determining module 402 determining the NAT detection result according to the comparison result, includes any of the following:

when the IP address of the requesting node in the obtained payload data is different from the IP address of the requesting node in the first IP header, or when the port number of the requesting node in the payload data is different from the port number of the requesting node in the first IP header, or when the SID of the requesting node in the payload data is different from the SID of the requesting node in the first IP header, determining that a NAT exists between the requesting node and a network; otherwise, determining that no NAT exists between the requesting node and the network; or when the IP address of the responding node in the obtained payload data is different from the IP address of the responding node in the first IP header, or when the port number of the responding node in the payload data is different from the port number of the responding node in the first IP header, or when the SID of the responding node in the payload data is different from the SID of the responding node in the first IP header, determining that a NAT exists between the responding node and a network; otherwise, determining that no NAT exists between the responding node and the network.

Optionally, the NAT detection result determined by the determining module 402 according to the comparison result is a second detection result, and the NAT detection result carried in the NAT detection result response message is a first detection result;

the first detection result is a detection result indicating whether a NAT exists between the requesting node and the responding node; and the second detection result includes a detection result indicating whether a NAT exists between the requesting node and the responding node, and a distribution position of the NAT when the NAT exists between the requesting node and the responding node.

Figure 5:
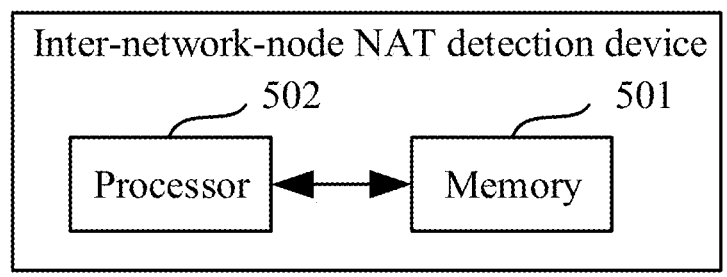
FIG. 5 is a schematic module diagram of a NAT detection device configured at a requesting node provided by embodiments of the present disclosure.

Based on the same inventive concept, some embodiments of the present disclosure also provide an inter-network-node NAT detection device, which is configured at a requesting node. As shown in FIG. 5, the device includes: a memory 501, configured to store program instructions; and a processor 502, configured to call the program instructions stored in the memory, and execute, according to an obtained program, the following process:

obtaining first node information, and use the obtained first node information as payload data of a NAT detection request message or a NAT detection result request message, wherein the first node information includes t an internet protocol (IP) address of the requesting node and an IP address of a configured responding node;

performing IP message encapsulation on the NAT detection request message or the NAT detection result request message, performing protection processing on a NAT detection request packet message obtained after the encapsulation, and sending the NAT detection request packet message after the protection processing to the responding node; and receiving the NAT detection response packet message; performing de-protection processing on the NAT detection response packet message; and when a NAT detection result response message is obtained from the NAT detection response packet message after the de-protection processing, obtaining a NAT detection result from the NAT detection result response message; or, when the NAT detection response message is obtained from the NAT detection response packet message after the de-protection processing, obtaining the payload data of the NAT detection response message, comparing the obtained payload data with a corresponding content in a second IP header of the NAT detection response packet message, and determining a NAT detection result according to a comparison result.

Optionally, the first node information further includes a port number of the requesting node, and a port number of the configured responding node; or, the first node information further includes a Session Identifier, SID of the requesting node, and a SID of the configured responding node.

Performing IP message encapsulation on the NAT detection request message or the NAT detection result request message, includes:

encapsulating the first node information into the first IP header of the NAT detection request packet message; and encapsulating the NAT detection request message or the NAT detection result request message into a first message content of the NAT detection request packet message.

Optionally, the NAT detection request message or the NAT detection result request message or the NAT detection response message includes an identifier indicating a message type and length information for parsing a quantity of IP addresses; and the NAT detection result response message includes an identifier indicating whether a NAT exists between the requesting node and the responding node.

Performing protection processing on the NAT detection request packet message, includes: performing at least one of encryption, data obfuscation, or integrity verification on the NAT detection request packet message.

Performing de-protection processing on the NAT detection response packet message, includes: performing at least one of decryption, data restoration, or integrity verification on the NAT detection response packet message.

Determining the NAT detection result according to the comparison result, includes: when the IP address of the responding node in the obtained payload data is different from the IP address of the responding node in the second IP header, or when the port number of the responding node in the payload data is different from the port number of the responding node in the second IP header, or when the SID of the responding node in the payload data is different from the SID of the responding node in the second IP header, determining that a NAT exists between the responding node and a network; otherwise, determining that no NAT exists between the responding node and the network; or when the IP address of the requesting node in the obtained payload data is different from the IP address of the requesting node in the second IP header, or when the port number of the requesting node in the payload data is different from the port number of the requesting node in the second IP header, or when the SID of the requesting node in the payload data is different from the SID of the requesting node in the second IP header, determining that a NAT exists between the requesting node and a network; otherwise, determining that no NAT exists between the requesting node and the network.

The NAT detection result determined according to the comparison result is a second detection result, and the NAT detection result carried in the NAT detection result response message is a first detection result; the first detection result is a detection result indicating whether a NAT exists between the requesting node and the responding node; and the second detection result includes a detection result indicating whether a NAT exists between the requesting node and the responding node, and a distribution position of the NAT when the NAT exists between the requesting node and the responding node.

Figure 6:
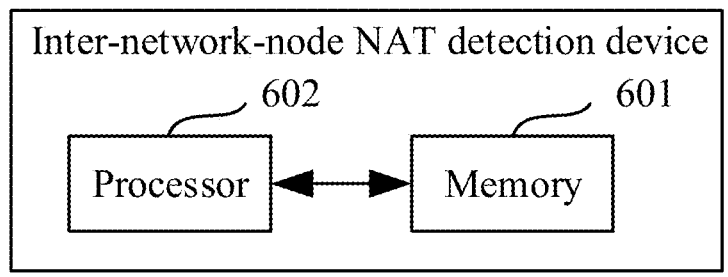
FIG. 6 is a schematic module diagram of a NAT detection device configured at a responding node provided by embodiments of the present disclosure.

Based on the same inventive concept, some embodiments of the present disclosure also provide an inter-network-node NAT detection device, which is configured at a responding node. As shown in FIG. 6, the device includes: a memory 601, configured to store program instructions; and a processor 602, configured to call the program instructions stored in the memory, and execute, according to an obtained program, the following process:

receiving a NAT detection request packet message, and performing de-protection processing on the received NAT detection request packet message;

obtaining a NAT detection request message or a NAT detection result request message from the NAT detection request packet message after the de-protection processing, comparing payload data in the obtained NAT detection request message or in the obtained NAT detection result request message with a corresponding content in a first IP header of the NAT detection request packet message, and determining a NAT detection result according to a comparison result; and when the NAT detection request message is obtained from the NAT detection request packet message after the de-protection processing, obtaining second node information which includes an IP address of the responding node, and an IP address of a requesting node that is obtained from the first IP header of the NAT detection request packet message, using the second node information as payload data of a NAT detection response message, performing IP message encapsulation on the NAT detection response message, performing protection processing on a NAT detection response packet message obtained after the encapsulation, and sending the NAT detection response packet message after the protection processing to the requesting node; or, when the NAT detection result request message is obtained from the NAT detection request packet message after the de-protection processing, carrying the NAT detection result in a NAT detection result response message, performing IP message encapsulation on the NAT detection result response message, performing protection processing on a NAT detection response packet message obtained after the encapsulation, and sending the NAT detection response packet message after the protection processing to the requesting node.

Optionally, the second node information further includes the port number of the responding node, and the port number of the requesting node obtained from the first IP header of the NAT detection request packet message; or, the second node information further includes the SID of the responding node, and the SID of the requesting node obtained from the first IP header of the NAT detection request packet message.

Performing IP message encapsulation on the NAT detection response message or the NAT detection result response message, includes: encapsulating, the second node information into the second IP header of the NAT detection response packet message; and encapsulating the NAT detection response message or the NAT detection result response message into a second message content of the NAT detection response packet message.

Performing de-protection processing on the NAT detection request packet message, includes: performing at least one of decryption, data restoration, or integrity verification on the NAT detection request packet message. Performing protection processing on the NAT detection response packet message, includes: performing at least one of encryption, data obfuscation, or integrity verification on the NAT detection response packet message.

Determining the NAT detection result according to the comparison result, includes any of the following: when the IP address of the requesting node in the obtained payload data is different from the IP address of the requesting node in the first IP header, or when the port number of the requesting node in the payload data is different from the port number of the requesting node in the first IP header, or when the SID of the requesting node in the payload data is different from the SID of the requesting node in the first IP header, determining that a NAT exists between the requesting node and a network; otherwise, determining that no NAT exists between the requesting node and the network; or when the IP address of the responding node in the obtained payload data is different from the IP address of the responding node in the first IP header, or when the port number of the responding node in the payload data is different from the port number of the responding node in the first IP header, or when the SID of the responding node in the payload data is different from the SID of the responding node in the first IP header, determining that a NAT exists between the responding node and a network; otherwise, determining that no NAT exists between the responding node and the network.

The NAT detection result determined according to the comparison result is a second detection result, and the NAT detection result carried in the NAT detection result response message is a first detection result; the first detection result is a detection result indicating whether a NAT exists between the requesting node and the responding node; and the second detection result includes a detection result indicating whether a NAT exists between the requesting node and the responding node, and a distribution position of the NAT when the NAT exists between the requesting node and the responding node.

Based on the same inventive concept, some embodiments of the present disclosure also provide a computer storage medium, wherein a computer program is stored thereon, when the computer program is executed by a processor, to implement steps of the inter-network-node NAT detection method provided in the first embodiment above.

In the embodiments provided in the present disclosure, it should be understood that the disclosed system, apparatus and method can be implemented in other ways. For example, the device embodiments described above are only illustrative. For example, the division of the units is only a logical function division. In actual implementation, there may be other division methods. For example, multiple modules or components can be combined or may be integrated into another system, or some features may be ignored, or not implemented. In another point, the mutual coupling or direct coupling or communication connection shown or discussed may be through some interfaces, and the indirect coupling or communication connection of devices or modules may be in electrical, mechanical or other forms.

The modules described as separate components may or may not be physically separated, and the components displayed as modules may or may not be physical modules, that is, they may be located in one place, or may be distributed to multiple network modules. Part or all of the modules can be selected according to actual needs to achieve the purpose of the solution of this embodiment.

In addition, each functional module in each embodiment of the present disclosure may be integrated into one processing module, each module may exist separately physically, or two or more modules may be integrated into one module. The above-mentioned integrated modules can be implemented in the form of hardware or in the form of software function modules. If the integrated modules are realized in the form of software function modules and sold or used as independent products, they can be stored in a computer-readable storage medium.

In the above embodiments, all or part of them may be implemented by software, hardware, firmware or any combination thereof. When implemented using software, it may be implemented in whole or in part in the form of a computer program product.

The computer program product includes one or more computer instructions. When the computer program instructions are loaded and executed on the computer, the processes or functions according to the embodiments of the present disclosure will be generated in whole or in part. The computer can be a general purpose computer, a special purpose computer, a computer network, or other programmable devices. The computer instructions may be stored in or transmitted from one computer-readable storage medium to another computer-readable storage medium, for example, the computer instructions may be transmitted from a website, computer, server, or data center to another website site, computer, server, or data center by wired (e.g., coaxial cable, optical fiber, digital subscriber line, DSL) or wireless (e.g., infrared, wireless, microwave, etc). The computer-readable storage medium may be any available medium that can be stored by a computer, or a data storage device such as a server or a data center integrated with one or more available media. The available medium may be a magnetic medium (e.g., a floppy disk, a hard disk, or a magnetic tape), an optical medium (e.g., DVD), or a semiconductor medium (e.g., a solid state disk, SSD) and the like.

The technical solutions provided by the present disclosure have been introduced in detail above. In the present disclosure, specific examples have been used to illustrate the principles and implementation methods of the present disclosure. The descriptions of the above embodiments are only used to help understand the methods and core ideas of the present disclosure. At the same time, for those skilled in the art, based on the idea of the present disclosure, there will be changes in the specific implementation and application scope. In summary, the content of this specification should not be construed as limiting the present disclosure.

What is claimed is:

1. An inter-network-node network address translation, NAT detection method, comprising:
obtaining, by a requesting node, a first node information, and using, by the requesting node, obtained first node information as payload data of a NAT detection request message or payload data of a NAT detection result request message, wherein the first node information comprises an internet protocol, IP address of the requesting node and an IP address of a responding node to be configured;
performing, by the requesting node, an IP message encapsulation on the NAT detection request message or the NAT detection result request message, performing, by the requesting node, a protection processing on a NAT detection request packet message obtained after the encapsulation, and sending, by the requesting node, the NAT detection request packet message after the protection processing to the responding node;
receiving, by the responding node, the NAT detection request packet message, and performing, by the responding node, a de-protection processing on received NAT detection request packet message;
obtaining, by the responding node, the NAT detection request message or the NAT detection result request message from the NAT detection request packet message after the de-protection processing, comparing, by the responding node, the payload data in obtained NAT detection request message or in obtained NAT detection result request message with a corresponding content in a first IP header of the NAT detection request packet message, and determining, by the responding node, a NAT detection result according to a comparison result;
in response to the responding node obtaining the NAT detection request message from the NAT detection request packet message after the de-protection processing, obtaining, by the responding node, a second node information which comprises the IP address of the responding node, and the IP address of the requesting node that is obtained from the first IP header of the NAT detection request packet message, using, by the responding node, the second node information as the payload data of a NAT detection response message, performing, by the responding node, the IP message encapsulation on the NAT detection response message, performing, by the responding node, the protection processing on a NAT detection response packet message obtained after the encapsulation, and sending, by the responding node, the NAT detection response packet message after the protection processing to the requesting node; or, in response to the responding node obtaining the NAT detection result request message from the NAT detection request packet message after the de-protection processing, carrying, by the responding node, a NAT detection result in a NAT detection result response message, performing, by the responding node, the IP message encapsulation on the NAT detection result response message, performing, by the responding node, the protection processing on a NAT detection response packet message obtained after the encapsulation, and sending, by the responding node, the NAT detection response packet message after the protection processing to the requesting node; and
receiving, by the requesting node, the NAT detection response packet message; performing, by the requesting node, the de-protection processing on the NAT detection response packet message; and in response to the requesting node obtaining the NAT detection result response message from the NAT detection response packet message after the de-protection processing, obtaining, by the requesting node, the NAT detection result from the NAT detection result response message; or, in response to the requesting node obtaining the NAT detection response message from the NAT detection response packet message after the de-protection processing, obtaining, by the requesting node, the payload data of the NAT detection response message, comparing, by the requesting node, obtained payload data with a corresponding content in a second IP header of the NAT detection response packet message, and determining, by the requesting node, the NAT detection result according to a comparison result.

2. The method according to claim 1, wherein the first node information further comprises a port number of the requesting node, and a port number of the responding node; or, the first node information further comprises a Session Identifier, SID of the requesting node, and a SID of the responding node; and
the second node information further comprises the port number of the responding node, and the port number of the requesting node obtained from the first IP header of the NAT detection request packet message; or, the second node information further comprises the SID of the responding node, and the SID of the requesting node obtained from the first IP header of the NAT detection request packet message.

3. The method according to claim 1, wherein the performing, by the requesting node, IP message encapsulation on the NAT detection request message or the NAT detection result request message, comprises:
encapsulating the first node information into the first IP header of the NAT detection request packet message; and
encapsulating the NAT detection request message or the NAT detection result request message into a first message content of the NAT detection request packet message; and
the performing, by the responding node, IP message encapsulation on the NAT detection response message or the NAT detection result response message, comprises:
encapsulating the second node information into the second IP header of the NAT detection response packet message; and
encapsulating the NAT detection response message or the NAT detection result response message into a second message content of the NAT detection response packet message.

4. The method according to claim 1, wherein:
the NAT detection request message or the NAT detection result request message or the NAT detection response message comprises an identifier indicating a message type and length information for parsing a quantity of IP addresses; and
the NAT detection result response message comprises an identifier indicating whether a NAT exists between the requesting node and the responding node.

5. The method according to claim 1, wherein the performing, by the requesting node, protection processing on the NAT detection request packet message, comprises:
performing, by the requesting node, at least one of encryption, data obfuscation, or integrity verification on the NAT detection request packet message; and
the performing, by the responding node, de-protection processing on the NAT detection request packet message, comprises:
performing, by the responding node, at least one of decryption, data restoration, or integrity verification on the NAT detection request packet message.

6. The method according to claim 1, wherein the performing, by the responding node, protection processing on the NAT detection response packet message, comprises:
performing, by the responding node, at least one of encryption, data obfuscation, or integrity verification on the NAT detection response packet message; and
the performing, by the requesting node, de-protection processing on the NAT detection response packet message, comprises:
performing, by the requesting node, at least one of decryption, data restoration, or integrity verification on the NAT detection response packet message.

7. The method according to claim 2, wherein the determining, by the responding node, the NAT detection result according to the comparison result, comprises any of following:
in response to the IP address of the requesting node in the obtained payload data being different from the IP address of the requesting node in the first IP header, or in response to the port number of the requesting node in the payload data being different from the port number of the requesting node in the first IP header, or in response to the SID of the requesting node in the payload data being different from the SID of the requesting node in the first IP header, determining that a NAT exists between the requesting node and a network; otherwise, determining that no NAT exists between the requesting node and the network;
in response to the IP address of the responding node in the obtained payload data being different from the IP address of the responding node in the first IP header, or in response to the port number of the responding node in the payload data being different from the port number of the responding node in the first IP header, or in response to the SID of the responding node in the payload data being different from the SID of the responding node in the first IP header, determining that a NAT exists between the responding node and a network; otherwise, determining that no NAT exists between the responding node and the network.

8. The method according to claim 2, wherein the determining, by the requesting node, the NAT detection result according to the comparison result, comprises:
in response to the IP address of the responding node in the obtained payload data being different from the IP address of the responding node in the second IP header, or in response to the port number of the responding node in the payload data being different from the port number of the responding node in the second IP header, or in response to the SID of the responding node in the payload data being different from the SID of the responding node in the second IP header, determining that a NAT exists between the responding node and a network; otherwise, determining that no NAT exists between the responding node and the network;
in response to the IP address of the requesting node in the obtained payload data being different from the IP address of the requesting node in the second IP header, or in response to the port number of the requesting node in the payload data being different from the port number of the requesting node in the second IP header, or in response to the SID of the requesting node in the payload data being different from the SID of the requesting node in the second IP header, determining that a NAT exists between the requesting node and a network; otherwise, determining that no NAT exists between the requesting node and the network.

9. The method according to claim 1, wherein:
the NAT detection result determined by the requesting node or the responding node according to the comparison result is a second detection result, and the NAT detection result carried in the NAT detection result response message is a first detection result;
the first detection result is a detection result indicating whether a NAT exists between the requesting node and the responding node; and
the second detection result comprises a detection result indicating whether a NAT exists between the requesting node and the responding node, and a distribution position of the NAT in response to the NAT existing between the requesting node and the responding node.

10. An inter-network-node network address translation, NAT detection device, configured at a requesting node and comprising:
a memory configured to store program instructions; and
a processor configured to call the program instructions stored in the memory, and implement followings, according to an obtained program:
obtaining a first node information, and using obtained first node information as a payload data of a NAT detection request message or a NAT detection result request message, wherein the first node information comprises an internet protocol, IP address of the requesting node and an IP address of a responding node to be configured;
performing an IP message encapsulation on the NAT detection request message or the NAT detection result request message, performing a protection processing on a NAT detection request packet message obtained after the encapsulation, and sending the NAT detection request packet message after the protection processing to the responding node; and
receiving the NAT detection response packet message; performing de-protection processing on the NAT detection response packet message; and in response to a NAT detection result response message being obtained from the NAT detection response packet message after the de-protection processing, obtaining a NAT detection result from the NAT detection result response message; or, in response to the NAT detection response message being obtained from the NAT detection response packet message after the de-protection processing, obtain the payload data of the NAT detection response message, comparing obtained payload data with a corresponding content in a second IP header of the NAT detection response packet message, and determining a NAT detection result according to a comparison result.

11. The device according to claim 10, wherein the first node information further comprises a port number of the requesting node, and a port number of the responding node;

or, the first node information further comprises a Session Identifier, SID of the requesting node, and a SID of the responding node.

12. The device according to claim 10, wherein:
the NAT detection request message or the NAT detection result request message or the NAT detection response message comprises an identifier indicating a message type and a length information for parsing a quantity of IP addresses; and
the NAT detection result response message comprises an identifier indicating whether a NAT exists between the requesting node and the responding node.

13. The device according to claim 10, wherein the processor is configured to call the program instructions stored in the memory to perform the protection processing on the NAT detection request packet message, by:
performing at least one of encryption, data obfuscation, or integrity verification on the NAT detection request packet message;
wherein processor is configured to call the program instructions stored in the memory to perform the de-protection processing on the NAT detection response packet message, by:
performing at least one of decryption, data restoration, or integrity verification on the NAT detection response packet message.

14. The device according to claim 11, wherein the processor is configured to call the program instructions stored in the memory to determine the NAT detection result according to the comparison result, by:
in response to the IP address of the responding node in the obtained payload data being different from the IP address of the responding node in the second IP header, or in response to the port number of the responding node in the payload data being different from the port number of the responding node in the second IP header, or in response to the SID of the responding node in the payload data being different from the SID of the responding node in the second IP header, determining that a NAT exists between the responding node and a network; otherwise, determining that no NAT exists between the responding node and the network; or
in response to the IP address of the requesting node in the obtained payload data being different from the IP address of the requesting node in the second IP header, or in response to the port number of the requesting node in the payload data being different from the port number of the requesting node in the second IP header, or in response to the SID of the requesting node in the payload data being different from the SID of the requesting node in the second IP header, determining that a NAT exists between the requesting node and a network; otherwise, determining that no NAT exists between the requesting node and the network.

15. The device according to claim 10, wherein the NAT detection result determined according to the comparison result is a second detection result, and the NAT detection result carried in the NAT detection result response message is a first detection result;
the first detection result is a detection result indicating whether a NAT exists between the requesting node and the responding node; and
the second detection result comprises a detection result indicating whether a NAT exists between the requesting node and the responding node, and a distribution position of the NAT in response to the NAT existing between the requesting node and the responding node.

16. An inter-network-node network address translation, NAT detection device, configured at a responding node and comprising:
a memory configured to store program instructions; and
a processor configured to call the program instructions stored in the memory, and implement followings according to an obtained program:
receiving a NAT detection request packet message, and performing a de-protection processing on received NAT detection request packet message;
obtaining a NAT detection request message or a NAT detection result request message from the NAT detection request packet message after the de-protection processing, comparing a payload data in obtained NAT detection request message or in obtained NAT detection result request message with a corresponding content in a first IP header of the NAT detection request packet message, and determining a NAT detection result according to a comparison result; and
in response to the NAT detection request message being obtained from the NAT detection request packet message after the de-protection processing, obtaining a second node information which comprises an IP address of the responding node, and an IP address of a requesting node that is obtained from the first IP header of the NAT detection request packet message, using the second node information as payload data of a NAT detection response message, performing an IP message encapsulation on the NAT detection response message, performing a protection processing on a NAT detection response packet message obtained after the encapsulation, and sending the NAT detection response packet message after the protection processing to the requesting node; or, in response to the NAT detection result request message being obtained from the NAT detection request packet message after the de-protection processing, carrying the NAT detection result in a NAT detection result response message, performing the IP message encapsulation on the NAT detection result response message, performing the protection processing on a NAT detection response packet message obtained after the encapsulation, and sending the NAT detection response packet message after the protection processing to the requesting node.

17. The device according to claim 16, wherein the second node information further comprises the port number of the responding node, and the port number of the requesting node obtained from the first IP header of the NAT detection request packet message; or, the second node information further comprises the SID of the responding node, and the SID of the requesting node obtained from the first IP header of the NAT detection request packet message.

18. The device according to claim 16, wherein the processor is configured to call the program instructions stored in the memory to perform de-protection processing on the NAT detection request packet message, by:
performing at least one of decryption, data restoration, or integrity verification on the NAT detection request packet message;
wherein the processor is configured to call the program instructions stored in the memory to perform the protection processing on the NAT detection response packet message, by:
performing at least one of encryption, data obfuscation, or integrity verification on the NAT detection response packet message.

19. The device according to claim 17, wherein the processor is configured to call the program instructions stored in the memory to the NAT detection result according to the comparison result, by any of following:

in response to the IP address of the requesting node in the obtained payload data being different from the IP address of the requesting node in the first IP header, or in response to the port number of the requesting node in the payload data being different from the port number of the requesting node in the first IP header, or in response to the SID of the requesting node in the payload data being different from the SID of the requesting node in the first IP header, determining that a NAT exists between the requesting node and a network; otherwise, determining that no NAT exists between the requesting node and the network; or in response to the IP address of the responding node in the obtained payload data being different from the IP address of the responding node in the first IP header, or in response to the port number of the responding node in the payload data being different from the port number of the responding node in the first IP header, or in response to the SID of the responding node in the payload data being different from the SID of the responding node in the first IP header, determining that a NAT exists between the responding node and a network; otherwise, determining that no NAT exists between the responding node and the network.

20. The device according to claim 16, wherein the NAT detection result determined according to the comparison result is a second detection result, and the NAT detection result carried in the NAT detection result response message is a first detection result;

the first detection result is a detection result indicating whether a NAT exists between the requesting node and the responding node; and the second detection result comprises a detection result indicating whether a NAT exists between the requesting node and the responding node, and a distribution position of the NAT in response to the NAT existing between the requesting node and the responding node.

* * * * *